Jan. 18, 1966   C. B. HAEGERT   3,230,499
BATTERY CLAMP CONNECTORS
Original Filed Sept. 15, 1960
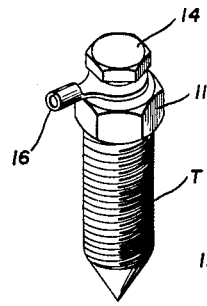
FIG. IA
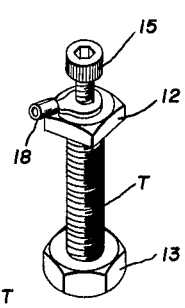
FIG. IB
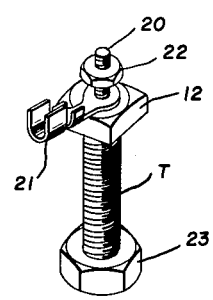
FIG. IC
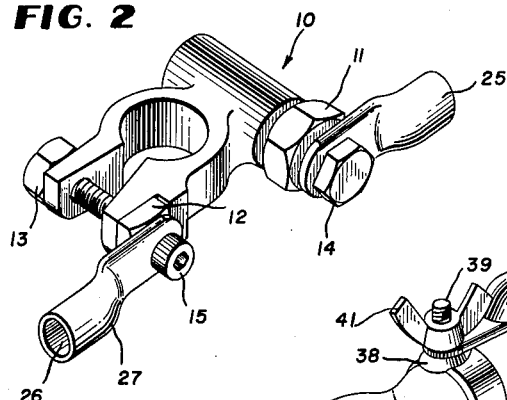
FIG. ID
FIG. 2
FIG. 3
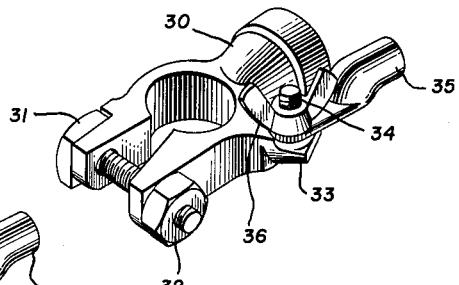
FIG. 4
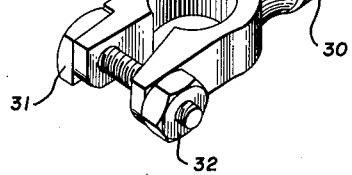
FIG. 5
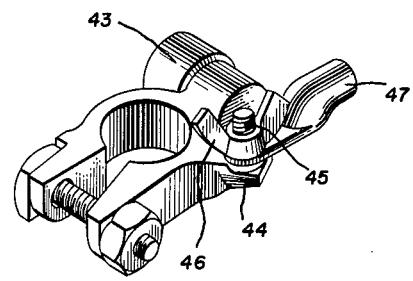
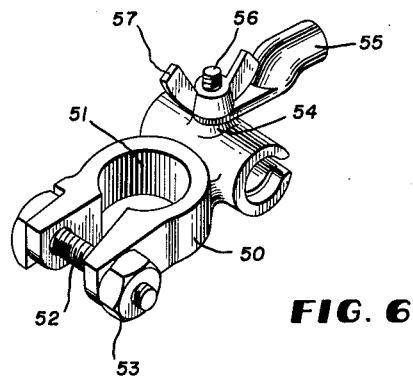
FIG. 6
INVENTOR.
CLARENCE B. HAEGERT
BY
*Shoemaker and Mattare*
ATTORNEYS United States Patent Office 3,230,499
Patented Jan. 18, 1966

3,230,499
BATTERY CLAMP CONNECTORS
Clarence B. Haegert, P.O. Box 318, Coffeyville, Kans.
Continuation of application Ser. No. 347,332, Feb. 14, 1964, which is a continuation of application Ser. No. 56,285, Sept. 15, 1960. This application Apr. 19, 1965, Ser. No. 450,256
1 Claim. (Cl. 339—230)

The present application is a continuation of application Ser. No. 347,332, now abandoned, which in turn is a continuation of application Ser. No. 56,285, filed Sept. 15, 1960, now abandoned.

The present invention relates to battery clamps and more particularly to a new and novel battery clamp for ready attachment thereto of a conductor or conductors.

The battery clamps of the present invention are permanently installed to provide a much desired means for connecting an additional lead or leads to standard battery clamps so as to permit the connection thereto of additional equipment. Such equipment may be an additional radio, for example, an FM radio, a two-way radio for intercommunications, an air-conditioning unit or similar equipment to be used in the automobile and for which there is no ready attachment or individual terminal provided. A further use or requirement for direct attachment of the conductors to a battery is to connect a group of batteries in parallel to power equipment.

There is no known prior device by which such connection may be made immediately at the battery itself rather than at other terminals in the automobile circuits without removing or adjusting in any way the already installed battery clamps.

One purpose of the present invention, therefore, is to provide means on the battery clamp itself to which conductors may be connected readily and involving no interference with or movement of attached clamps. A second purpose is to provide a terminal or terminals in a circuit not controlled by the ignition switch and not involving connection to the automobile circuits to which conductors may be immediately attached.

It is accordingly an object of the present invention to provide a battery clamp to which power units in addition to the standard automobile equipment may be readily connected.

It is another object of the present invention to provide a battery clamp terminal for a wide variety of present battery clamps thereby enabling direct connection to be made to such clamps.

It is a further object of the present invention to provide a battery clamp terminal to which additional conductors may be attached from a plurality of directions.

It is a further object of this invention to provide an additional terminal or terminals which may be attached at a variety of positions on existing battery clamps or their fittings.

It is a further object of the present invention to provide a battery clamp having means integral therewith for the attachment of conductors which is simple and inexpensive in construction, and yet reliable and sturdy in operation.

Other objects and many of the attendant advantages of the present invention will become apparent when considered in connection with the following specifications and accompanying drawings, wherein:

FIG. 1A illustrates one embodiment of the present invention; FIG. 1B illustrates a second embodiment of the present invention; and FIG. 1C illustrates a third embodiment of the present invention; FIG. 1D illustrates more in detail a feature of the embodiment of FIG. 1B;

FIG. 2 illustrates the embodiments of FIGS. 1A and 1B as attached to a battery clamp;

FIG. 3 illustrates a fourth embodiment of the present invention;

FIG. 4 illustrates an alternate attachment for the embodiment shown in FIG. 3;

FIG. 5 illustrates the embodiment of FIG. 3 attached to a standard elbow battery clamp; and FIG. 6 shows the embodiment of FIG. 4 attached to a split type battery clamp.

The present invention provides an arrangement whereby quick connection may be made easily and securely to a battery clamp without removing the battery clamp from the battery post. The various attaching means for a variety of battery clamps and battery clamp fittings are shown in the figures, and will now be discussed more in detail.

Referring to FIGS. 1A, 1B and FIG. 2, there is shown the battery terminal clamp 10 of applicant's Patent No. 2,940,060 including cable expansion bolt 11 and bolt 12, the latter having attached thereto nut 13 for drawing toward one another the jaws of the clamp. The expansion bolt 11 is presented in greater detail in FIG. 1A while the bolt 12 is shown in enlarged view in FIGS. 1B, 1C and 1D.

Expansion bolt 11 and bolt 12, as shown in FIGS. 1A and 1B, have set screws 14 and 15, respectively, inserted in one end thereof in holes tapped therein such as 19 in bolt 12 which is shown in FIG. 1D. The diameters of the tapped holes are substantially less than the diameters of the threaded portions T to retain adequate strength in the shaft of the bolts. Bolts 11 and 12 are tapped at the head thereof to accommodate set screws 14 and 15, respectively. The set screws serve as receiving means to receive and hold conductors which are to be attached to the battery clamp.

Lugs 16 and 17 are positioned over set screws 14 and 15, respectively, and may have conductors, not shown, attached either before the set screws are tightened in their respective bolts or after such tightening. In this regard, it is noted that the clamp of FIG. 2, for example, shows an embodiment of the present invention as it may appear when secured about the battery post and before additional conductors are attached.

The clamp of FIG. 2 illustrates one embodiment of the device of the present invention in the form in which it is marketed. Lugs 25 and 27 are included with the clamp, and attaching set screws 14 and 15 also are provided. It will be appreciated that the lugs may be removed from the assembly before or after the clamp is secured about the battery post, and that conductors may be attached to the lugs while removed leaving simply the insertion and tightening of set screws 14 and 15 to effect firm connection of the lugs to the clamp.

In FIG. 1C, the bolt is shown with a threaded extension 20 on the head end of the bolt to receive lug 21 and nut 22. Extension 20 may have any of a variety of diameters and may extend instead from the nut end, in which case, however, its diameter would necessarily be less than the diameter of the threaded section T of bolt 18 such that a holding means such as nut 23 may be positioned over the threaded extension.

Referring again to FIG. 2 bolt 11 is shown with set screw 14 inserted in tightened position holding lug 25 in tight connection to battery clamp 10, and lug 27 is shown tightened against the head of bolt 12. Lug 27 is hollow, as indicated at 26, to receive the end of a conductor such that the lug may be crimped in the usual manner after the conductor has been bared and inserted in the opening thereof. A comparable opening exists in lug 25 though it is not shown. Lug 25, before tightened against bolt 11, may be directed in any direction about the periphery of the bolt, thereby providing a wide choice of attaching azimuth or direction to the conductor.

Lug 27 is attached to bolt 12 of the battery clamp and is of the variety shown in FIG. 1B wherein set screw 15 is inserted in a tapped hole, shown in FIG. 1D in bolt 12. It will be appreciated that both lugs 25 and 27 may be tightened in position without affecting the tightness of bolts 11 or 12 or clamp 10 after the clamp has been secured about the battery part. That is, the attachment of lugs 25 and 27 is entirely independent of the fitting and tightness of the battery clamp and the battery cable leading from the clamp.

In FIG. 3, there is shown a conventional battery clamp 30, having bolt 31 and nut 32 attached thereto and to which a terminal branch 33 has been added integral with the clamp 30. Attached integrally to the terminal branch is threaded extension 34 which is adapted to receive over it lug 35 and holding means such as wing nut 36. The branch 33 may, as in previous embodiments, be tapped in lieu of having threaded extension 34 attached thereto, and may accommodate a set screw such as 15 in FIG. 2 therewithin to hold in position lug 35. It will be appreciated that in this emobdiment substantially 360-degree freedom is obtained in the direction to which lug 35 may extend, the angular portion of a complete circle in which the connector is restricted being somewhat less than 90° of rotation about extension 34.

In FIG. 4, there is shown a conventional clamp 30 and bolt 31 tightened by nut 32 with, however, terminal branch 38 included on the periphery 39 of the battery clamp. The branch 38 may be welded or soldered or in other ways made integral with clamp 30. In the embodiment illustrated, branch 38 has extending from it threaded extension 39 which is adapted to receive lug 40 and holding means such as wing nut 41. In the embodiment of FIG. 4, the conductor to which lug 40 is attached may extend in any direction about extension 39.

It is again emphasized that the lug connections in FIGS. 2, 3 and 4 are entirely separate and distinct from the procedure of attaching battery clamps to the battery post. There is absolutely no requirement that the battery post be moved or loosened or affected in any other way by attachment of the different conductors such as will be inserted in lugs 25, 27, 35 and 40. It will also be appreciated that the hollow lug illustrated in FIGS. 2, 3 and 4 may be replaced by lugs such as 16, 17 and 21 in FIGS. 1A, 1B and 1C within the concept of this invention, or by other similar connectors.

Referring now to FIG. 5, an elbow type battery terminal 43 is shown to which terminal branch 44 has been attached or made integral. Threaded extension 45 corresponds to similar extensions 34 in FIG. 3 and 39 in FIG. 4 and wing nut 46 is similarly tightened over threaded extension 45 to hold lug 47 firmly in place. The branch 44 is positioned opposite to the side of the battery clamp into which the battery cable is led, thereby providing greater freedom in the area where the terminal branch is located.

Referring to FIG. 6, the split-type terminal 50 is shown having its opening 51 for positioning over the battery post and bolt 52 with nut 53 for tightening to the post. Terminal branch 54 is positioned at the periphery at the split terminal above the level of the battery post thereby permitting greater freedom of movement for the lug 55 about extension 56. Wing nut 57, as its counterparts in FIGS. 3, 4 and 5 have been described, is readily accessible to the person attaching lug 55 to the branch and is easily tightened without interference whatsoever with the battery clamp on the battery post or the cable connection to the battery clamp. It is again noted that lug 55 may be replaced by lugs such as 17 in FIG. 1B and 21 in FIG. 1C or other such connectors, without the concepts of the present invention.

It is apparent therefore that the connection of a conductor or conductors to either the attaching bolt of the battery clamp or to the clamp itself may be effected in an extremely simple manner and without in any way disturbing or changing the positioning of the battery clamp about the battery post. It should also be noted that although various types of lugs for insertion over the threaded extensions have been shown, the invention is not limited to such lugs, but is extended to all similar means by which a conductor may be adapted for firm connection to a terminal.

It is apparent from the foregoing that there is provided a new and novel battery clamp terminal wherein a conductor may readily be attached and quickly removed thereby preventing or avoiding any need to either remove the existing battery clamp and add fixtures to which conductors may be attached or to attach the conductors at other points in the electrical circuit of the automobile. The device is quite simple and inexpensive in construction, and yet is readily accessible for attachment of conductors thereto.

As this invention may be embodied in several forms without departing from the spirit or essential characteristics thereof, the present embodiment is therefore illustrative and not restrictive and since the scope of the invention is defined by the appended claim, all changes that fall within the metes and bounds of the claim or that form their functional as well as conjointly cooperative equivalents are therefore intended to be embraced by that claim.

I claim:

A battery terminal clamp unit comprising a body, means including a resilient clamping portion defining an opening adapted to receive a battery terminal, said clamping portion lying in a plane and having free spaced ends carrying aligned openings at one side of said first named opening, said body at the other side of said opening having walls defining a substantially cylindrical opening lying in said plane, said aligned openings and said cylindrical opening respectively receiving threaded bolts, the threaded bolt in said aligned openings operating to draw said free spaced ends together to clamp said unit to said battery terminal and means cooperating with the threads on said bolt in said cylindrical portion to secure the last named bolt to the unit and further to clamp a battery cable to said unit, each of said bolts having an integral head at one end, each of said bolts having a threaded opening extending axially inwardly from the headed end thereof, and headed clamping screws threaded in each of said last named threaded openings and the head on the bolt and the corresponding head on the screw cooperating to clamp lug ends to said unit.

References Cited by the Examiner

UNITED STATES PATENTS

| | | | |
|---|---|---|---|
| 582,462 | 5/1897 | Dickerson | 339—277 |
| 1,697,954 | 1/1929 | Gribbie | 339—277 |
| 2,015,144 | 9/1935 | Hoover | 339—272 |
| 2,940,060 | 6/1960 | Haegert | 339—100 |

FOREIGN PATENTS

| | | |
|---|---|---|
| 281,755 | 12/1927 | Great Britain. |

JOSEPH D. SEERS, *Primary Examiner.*

W. DONALD MILLER, *Examiner.*